(12) United States Patent
Watanabe

(10) Patent No.: US 7,136,420 B2
(45) Date of Patent: Nov. 14, 2006

(54) RECORDING OF SUPER-AUDIO OR LIKE ONE-BIT-PER-SAMPLE SIGNALS ON A PCM RECORDER

(75) Inventor: Kazuo Watanabe, Iruma (JP)

(73) Assignee: TEAC Corporation (JP)

( * ) Notice: Subject to any disclaimer, the term of this patent is extended or adjusted under 35 U.S.C. 154(b) by 798 days.

(21) Appl. No.: 10/213,500

(22) Filed: Aug. 6, 2002

(65) Prior Publication Data

US 2003/0031262 A1 Feb. 13, 2003

(30) Foreign Application Priority Data

Aug. 10, 2001 (JP) ............... 2001-244736

(51) Int. Cl.
*H04B 14/06* (2006.01)
*H03M 7/32* (2006.01)

(52) U.S. Cl. ........................ 375/247; 341/77
(58) Field of Classification Search ................. 375/247
See application file for complete search history.

(56) References Cited

U.S. PATENT DOCUMENTS 4,243,977 A * 1/1981 Everard ...................... 341/77
6,087,968 A * 7/2000 Roza ......................... 341/143
6,160,953 A * 12/2000 Fuchigami et al. ......... 386/105

FOREIGN PATENT DOCUMENTS

JP        00/114971        4/2000

\* cited by examiner

*Primary Examiner*—Temesghen Ghebretinsae
*Assistant Examiner*—Juan Alberto Torres
(74) *Attorney, Agent, or Firm*—Woodcock. Washburn LLP

(57) ABSTRACT

An eight-channel PCM recorder is utilized for recording two channels of delta-sigma modulated audio signals. Employed to this end is a PCM adapter comprising a bit stream divider for dividing the bit streams of the delta-sigma modulated signals into series of sixteen-bit segments, and a reformatter for rearranging the bit segments into eight signals having a format in agreement with the format of the PCM signals normally handled by the PCM recorder. The eight reformatted delta-sigma signals are introduced into the PCM recorder thereby to be recorded in place of the eight channels of PCM signals.

9 Claims, 10 Drawing Sheets

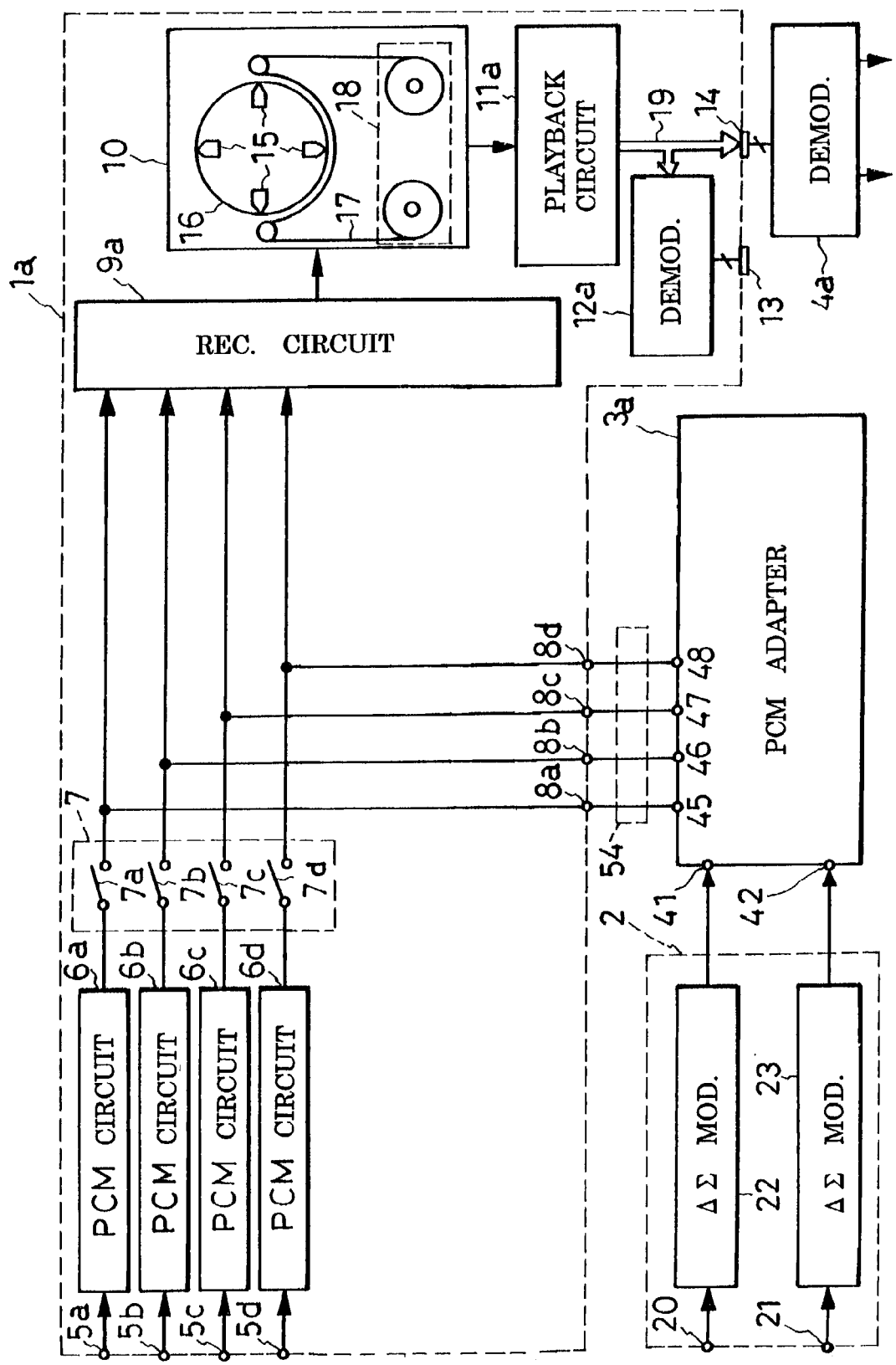

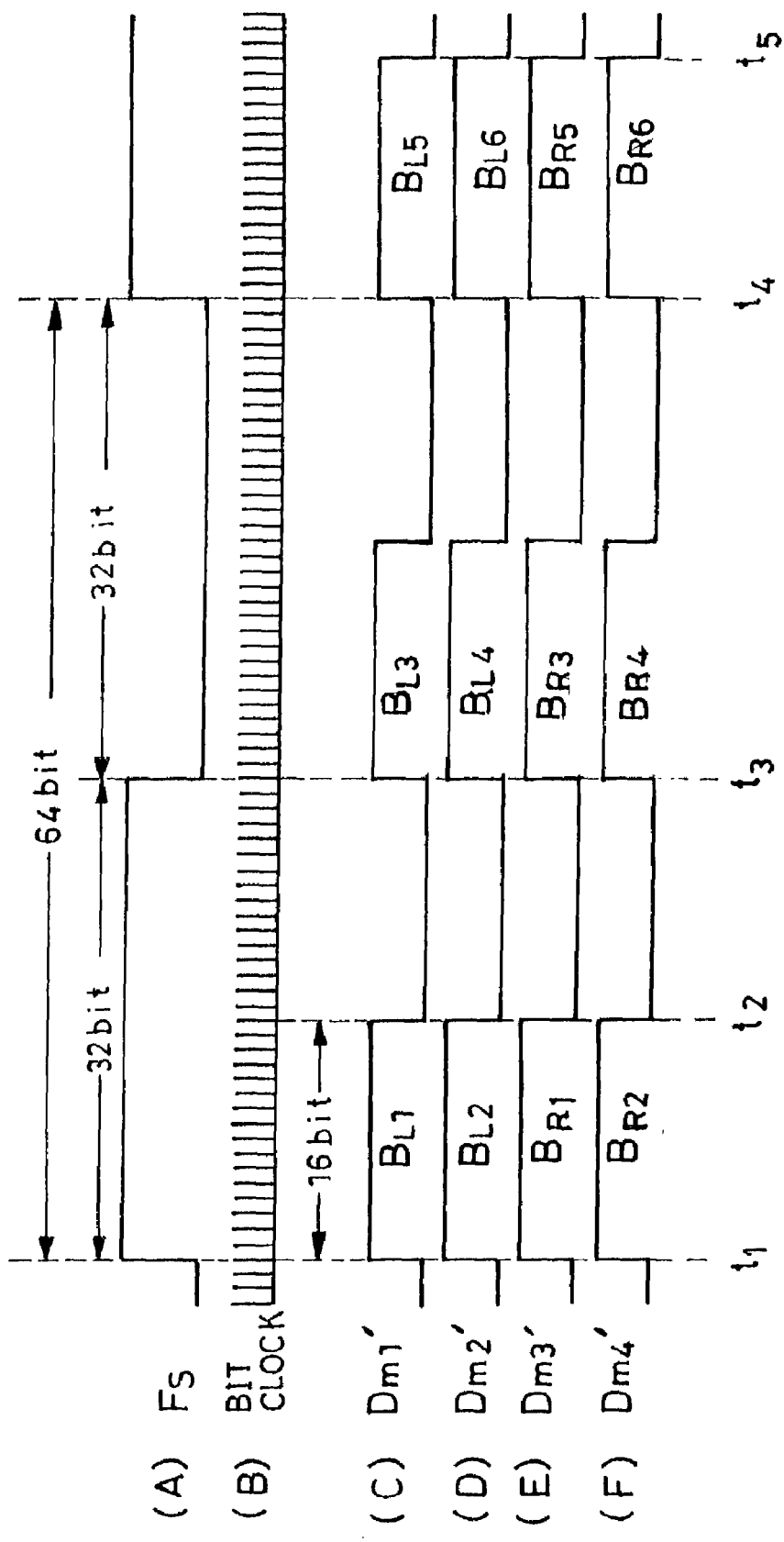

RECORDING OF SUPER-AUDIO OR LIKE ONE-BIT-PER-SAMPLE SIGNALS ON A PCM RECORDER

BACKGROUND OF THE INVENTION

This invention relates generally to the recording of digital signals and pertains more specifically to a method of, and apparatus for, recording a super-audio or like digital signal in which each sample of the original analog signal is expressed by one bit of digital data, that is, by either binary 0 or 1.

The so called "super audio compact disk" (SACD), with its greatly extended range of frequencies compared to that of the more conventional compact disk, has recently been developed by SONY® and PHILIPS® and introduced to the market the world over. Recorded on the SACD is what is known as the "direct stream digital" (DSD) signal. The DSD is essentially equivalent to delta-sigma (or sigma-delta) modulation, in which each sample of the analog signal is translated into either of the two binary digits, 0 and 1, as will later be explained in more detail. Japanese Unexamined Patent Publication No. 2000-114971 is hereby cited as dealing with delta-sigma modulation.

Whereas each sample of the audio signal is translated into a plurality of, sixteen for example, bits in the more conventional pulse-code modulation, the delta-sigma modulation employs but either of the binary digits 0 and 1 for expressing each sample of the analog signal. Let it be assumed that a stream of audio signal is now both delta-sigma and pulse-code modulated into two different digital signals that are the same in the total number of bits. Then the sampling frequency of delta-sigma modulation can be made very much, sixteen times for example, higher than that of pulse-code modulation. A higher-resolution analog-to-digital conversion is therefore possible by delta-sigma modulation without an increase in the total number of bits for a given signal volume.

Being inherently different from pulse code modulation, delta-sigma modulation has so far demanded a dedicated recorder. As currently manufactured, such dedicated delta-sigma modulation recorders are very expensive because they are not currently mass-produced by reason of the yet limited popularity of SACDs.

SUMMARY OF THE INVENTION

The present invention seeks to make delta-sigma-modulated, or like one-bit-per-sample, digital signals recordable by universal recorders for pulse-code-modulated (multiple-bit-per-sample) signals without any major alteration in construction, and hence to make the recording of such signals less costly than heretofore.

Briefly stated in one aspect thereof, the present invention provides a method of recording a one-bit-per-sample digital signal by means of a pulse code modulation recorder capable of recording a plurality of channels of pulse-code-modulated signals. The method dictates inputting an analog signal into a one-bit-per-sample signal in the form of a stream of bits, such that each sample of an analog signal is expressed by either of two binary digits. The bit stream of the one-bit-per-sample signal is then divided into a series of segments each constituted of a predetermined number of bits. Then the bit segments of the one-bit-per-sample signal are rearranged into a plurality of reformatted one-bit-per-sample signals having a format in agreement with that of the pulse-code-modulated signals that are normally recorded by the pulse code modulation recorder. Then the reformatted one-bit-per-sample signals are introduced into the pulse code modulation recorder thereby to be recorded on any desired record medium.

Another aspect of the invention concerns an apparatus for use in the practice of the above summarized recording method. In a preferred embodiment the apparatus includes a multichannel pulse code modulation recorder of mostly prior art design comprising a plurality of pulse code modulator circuits for pulse-code-modulating multichannel analog signals according to a predefined format, and a recording circuit having inputs connected respectively to the pulse code modulator circuits for processing the pulse-code-modulated signals preparatory to recording on a record medium. External to this multichannel pulse code modulation recorder are a one-bit-per-sample modulator circuit for modulating an analog signal into a one-bit-per-sample signal, and a pulse code modulation adapter connected to the one-bit-per-sample modulator circuit for reformatting the one-bit-per-sample signal into a plurality of signals having a format in agreement with that of the pulse-code-modulated signals normally recorded by the recorder. The pulse code modulation adapter is coupled to the multichannel pulse code modulation recorder for delivering thereto the reformatted one-bit-per-sample signals to be recorded.

Thus, according to the invention, the bit stream of the delta-sigma modulated or like one-bit-per-sample signal, or of each of two channels of such signals, is broken up into a series of segments each consisting of a prescribed number of bits. Such bit segments are reformatted into agreement with the familiar format of pulse-code modulated signals, in order to be recorded by the largely conventional multichannel pulse code modulation recorder.

The pulse code modulation recorder for use in the practice of the present invention may be either a preexisting one or newly redesigned to incorporate some minor modifications. A preexisting recorder is adaptable for recording one-bit-per-sample signals merely by connection of the pulse code modulation adapter thereto. Most parts of a redesigned recorder will lend themselves to use in recording both pulse-code modulated and one-bit-per-sample signals. Either way, the expenses for the recording of one-bit-per-sample signals will be far less than in use of dedicated one-bit-per-sample recorders.

The above and other objects, features and advantages of this invention will become more apparent, and the invention itself will best be understood, from a study of the following detailed description and appended claims, with reference had to the attached drawings showing some preferred embodiments of the invention.

BRIEF DESCRIPTION OF THE DRAWINGS

FIG. 8 is a diagram similar to FIG. 1 but showing an alternative form of recording system according to the invention;

FIG. 10, consisting of (A) through (F), is a waveform diagram explanatory of how the delta-sigma modulated signals are reformatted into signals that are recordable by the pulse code modulation recorder of FIG. 8.

DESCRIPTION OF THE PREFERRED EMBODIMENTS

General

Figure 1:
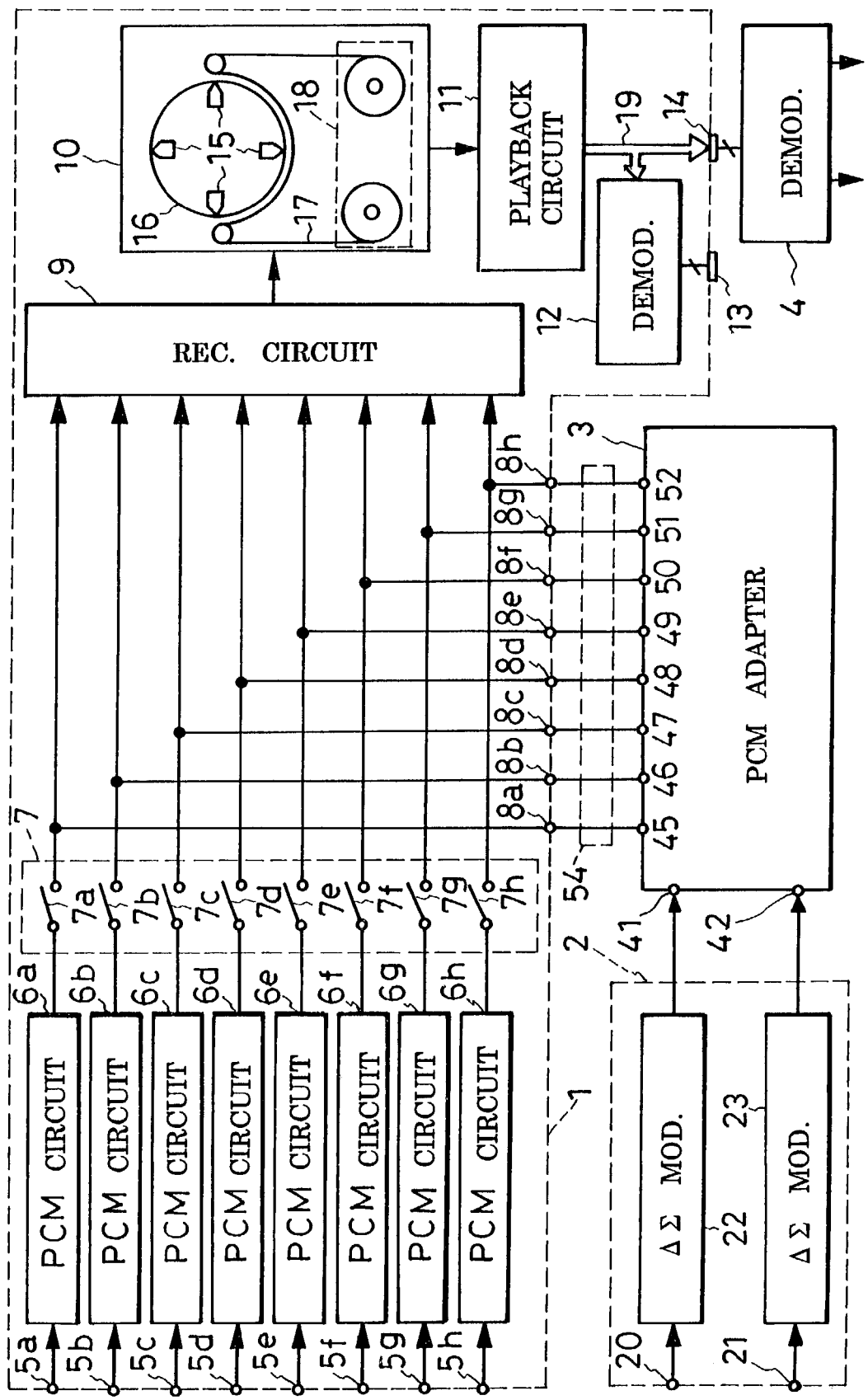
FIG. 1 is a block diagram of the one-bit-per-sample signal recording system configured according to the novel concepts of the present invention.

The present invention is believed to be best embodied in the super-audio recording system diagramed in FIG. 1. The representative recording system makes use of an eight-channel, pulse-code-modulation (PCM) recorder/player 1 of largely, not wholly, conventional design for recording delta-sigma-modulated super-audio signals. Appended to this PCM recorder/player 1 according to the teachings of this invention are a one-bit-per-sample (delta-sigma) modulator circuit 2, a PCM adapter 3, and a one-bit-per-sample demodulator 4. The one-bit-per-sample modulator circuit 2 is shown to comprise two delta-sigma modulators of prior art make, each constructed as in FIG. 2, for modulating two channels of analog audio signals into one-bit-per-sample digital signals (hereinafter referred to as the one-bit signals) to be recorded, as will be later discussed in more detail with reference to FIG. 3.

Inputting these two channels of one-bit signals from the modulator circuit 2, the PCM adapter 3 translates them into eight channels of reformatted one-bit signals that can be recorded by the eight-channel PCM recorder/player 1. The PCM adapter 3 is shown in detail in FIG. 4, and its operation is illustrated by the waveform diagrams of FIGS. 5 and 6. All the reformatted one-bit signals, seen at (C) through (J) in FIG. 6, are introduced from the PCM adapter 3 into the recorder/player 1 thereby to be recorded in lieu of PCM signals.

The one-bit-per-sample demodulator 4 is for use in playback of the reformatted one-bit signals recorded. It rearranges the eight channels of recovered reformatted one-bit signals into the initial two channels and demodulates each channel of one-bit signal into an analog audio signal for audible reproduction. The demodulator 4 is shown as an incidental feature of the invention.

Hereinafter in this specification the above listed PCM recorder/player 1, one-bit-per-sample modulator circuit 2, and PCM adapter 3 will be described in more detail, in that order and under separate headings.

PCM Recorder/Player

With reference to FIG. 1 the PCM recorder/player 1 is shown to have eight analog input terminals $5_a$–$5_h$ for inputting as many channels of analog audio signals in this particular embodiment. These analog input terminals $5_a$–$5_h$ are to be connected to microphones, not shown, or like sources of analog signals to be recorded. The analog input terminals $5_a$–$5_h$ are all connected respectively to the inputs of PCM circuits $6_a$–$6_h$ whereby the analog input signals are conventionally pulse-code modulated into multiple-bit-per-sample digital signals (hereinafter referred to as the PCM signals). Each of the PCM circuits $6_a$–$6_h$ samples the associated analog input signal by the sampling signal $F_s$ seen at (A) in FIG. 6. The sampling signal $F_s$ is high during each thirty-two bits period, as from $t_1$ to $t_3$ in FIG. 6, and low during the next thirty-two bits period, as from $t_3$ to $t_4$, of the bit clock pulses shown at (B) in FIG. 6.

Derived from each analog input signal by the sampling signal $F_s$, each sample is pulse-code modulated into a sixteen-bit-per-sample digital signal. The PCM signals are formatted with the same cycles as those of the sampling signal $F_s$. The sixteen bits constituting each sample of the PCM signals are contained in each sixty-four bit period of the bit clock pulses.

The outputs of the PCM circuits $6_a$–$6_h$ are connected via a PCM signal selector switch circuit 7 to a recording circuit 9. The PCM signal selector switch circuit 7 comprises eight on/off switches $7_a$–$7_h$ connected to the respective PCM circuits $6_a$–$6_h$. The switches $7_a$–$7_h$ are to be turned on when the PCM signals from the associated PCM circuits $6_a$–$6_h$ are to be recorded, and off when they are not. These switches will be unnecessary in cases where there is no fear of mutual interference between the PCM signals from the PCM circuits $6_a$–$6_h$ and the reformatted one-bit signals from the PCM adapter 3.

Figure 7:
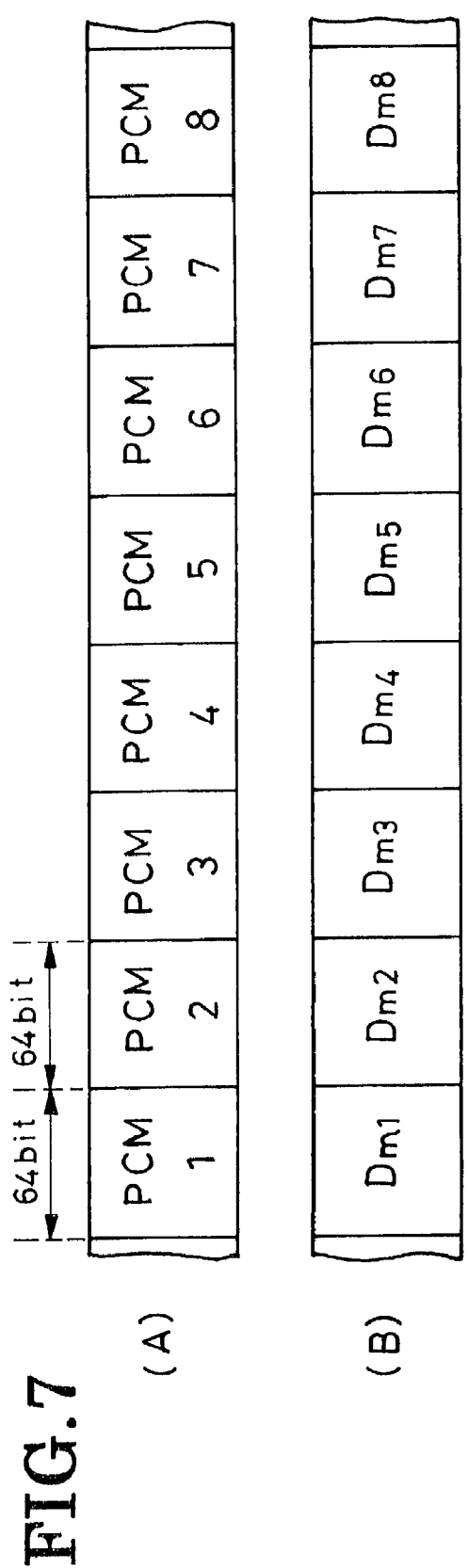
FIG. 7, consisting of (A) and (B), is a diagram explanatory of how the pulse-code-modulated and reformatted-one-bit-per-sample signals are recorded by the pulse code modulation recorder of FIG. 1.

The recording circuit 9 has inputs connected to the PCM circuits $6_a$–$6_h$ via the switch circuit 7 and directly to a set of inputs $8_a$–$8_h$ for inputting the reformatted one-bit signals from the PCM adapter 3. Upon inputting the PCM signals $PCM_1$–$PCM_8$ in parallel from the PCM circuits $6_a$–$6_h$, the recording circuit 9 compresses them in time and rearranges the time-compressed signals serially as diagramed at (A) in FIG. 7. The reformatted one-bit signals $Dm_1$–$Dm_8$ from the PCM adapter 3 are likewise compressed in time and rearranged serially as at (B) in FIG. 7. The resulting serial output from the recording circuit 9, either the PCM bit stream of FIG. 7(A) or the reformatted one-bit signal bit stream of FIG. 7(B), is directed into record/playback means 10.

Connected between the recording circuit 9 and a playback circuit 11, the record/playback means 10 is equipped for both recording and playback of the PCM signals and the reformatted one-bit signals. The particular example of record/playback means 10 shown here is equivalent to the revolving-head, magnetic tape apparatus disclosed in Japanese Unexamined Patent Publication No. 6-259711. This prior art apparatus has four magnetic heads 15 built into a rotary drum 16. As a length of magnetic tape 17, pulled out from a tape cassette 18, travels past the rotary drum 16, the four revolving magnetic heads 15 successively create a series of slanting data tracks on the tape. The magnetic recordings on the tape 17 are to be retrieved therefrom by the same set of heads 15.

The playback circuit 11 re-extends the serial bit stream of FIG. 7(A) back into the original PCM signals $PCM_1$–$PCM_8$, or that of FIG. 7(B) back into the original reformatted one-bit signals $Dm_1$–$Dm_8$.

Thus recovered from the magnetic tape 17, the PCM signals $PCM_1$–$PCM_8$ are delivered from the playback circuit 11 to a pulse-code demodulator 12 by way of a multichannel transmission path 19. The demodulator 12 demodulates the eight channels of PCM signals into the original analog audio signals and sends them out to an analog output 13.

The PCM recorder/player 1 has another output 14 to which is shown connected the demodulator 14. This demodulator 14 is for reconverting the reformatted one-bit signals $Dm_1$–$Dm_8$ back into the two channels of one-bit signals and further reconverting them into the original analog audio signals.

One-Bit-Per-Sample Modulator Circuit

The one-bit-per-sample modulator circuit 2 is shown incorporating two delta-sigma modulators 22 and 23 as examples of one-bit-per-sample modulators. The delta-sigma modulators 22 and 23 are connected respectively to input terminals 20 and 21 for inputting two channels of analog audio signals. The two delta-sigma modulators 22 and 23 are each constructed as indicated block-diagrammatically in FIG. 2 for modulating each channel of signal into one-bit-per-sample format according to the prior art.

Figure 2:
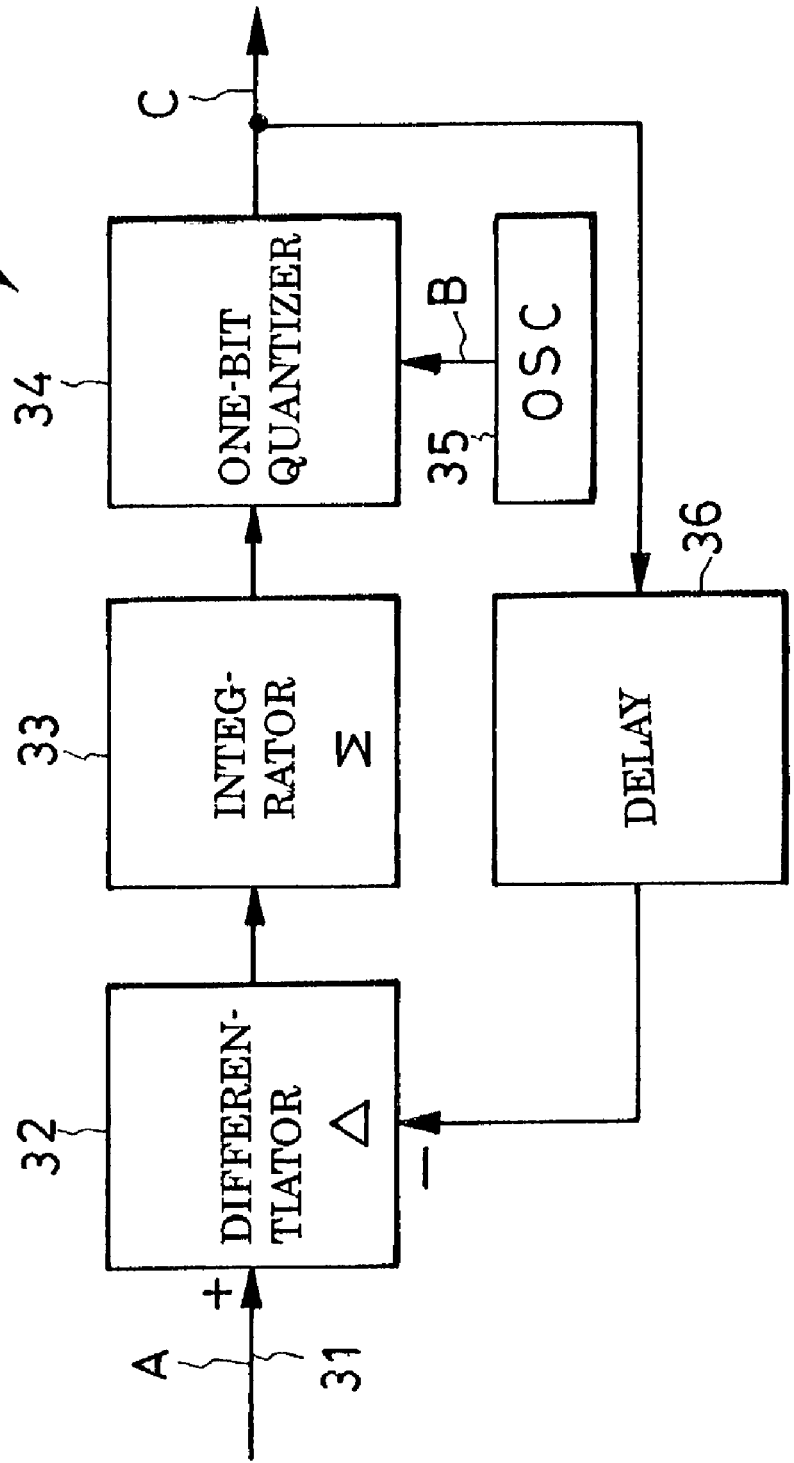
FIG. 2 is a block diagram of a delta-sigma modulator of conventional design used for digitizing an analog audio signal into a one-bit-per-sample digital signal in the FIG. 1 recording system.

With reference to FIG. 2 each delta-sigma modulator 22 or 23 is such that an analog input line 31 is connected to a differentiator 32, thence to an integrator 33, and thence to a one-bit quantizer 34. A bit clock 35 is also connected to the quantizer 34. The output of the quantizer 34 is connected via a delay circuit 36 to the differentiator 32 thereby forming a negative feedback loop.

Figure 3:
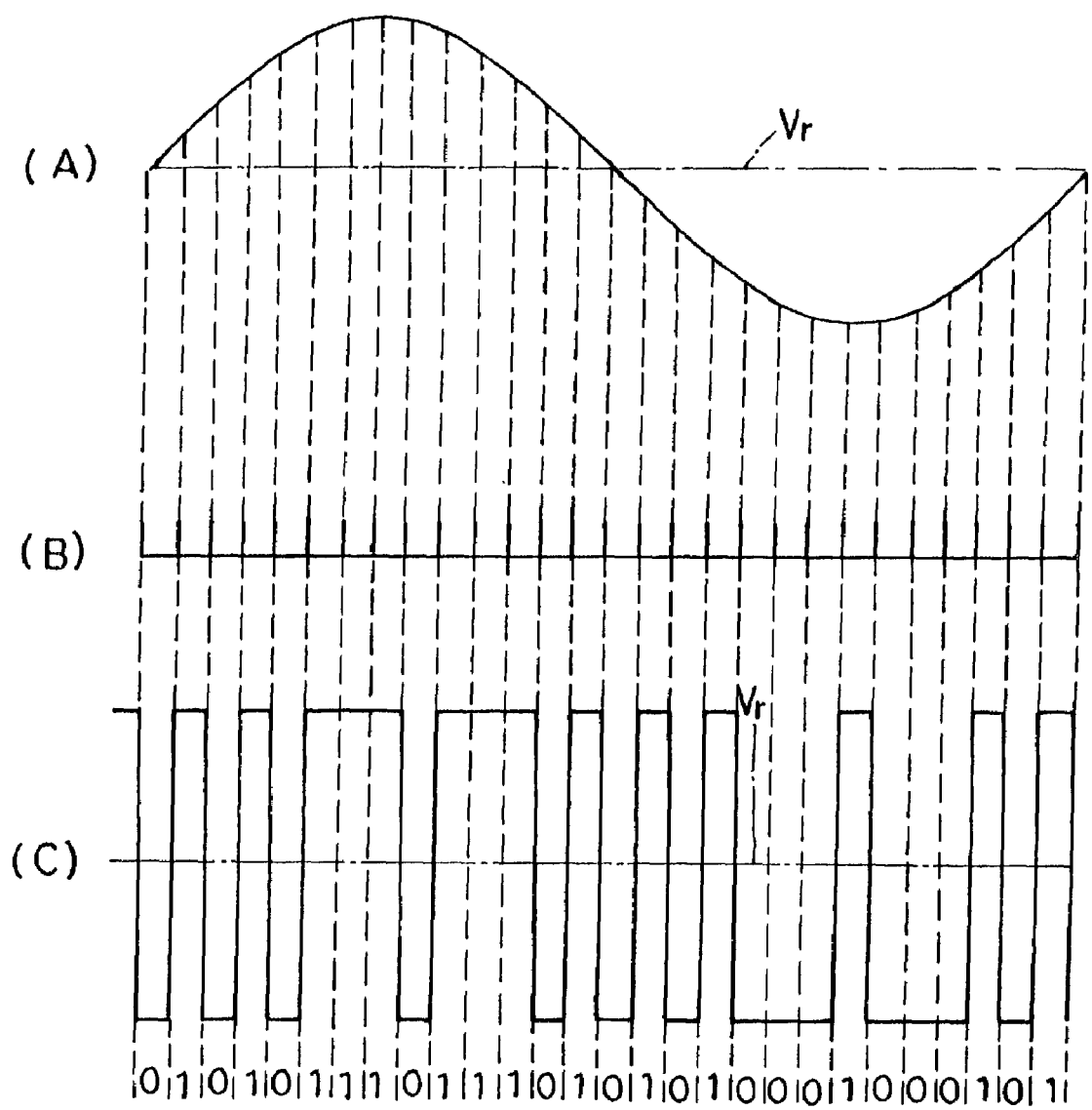
FIG. 3, consisting of (A) through (C), is a diagram of waveforms appearing in various parts of the FIG. 2 delta-sigma modulator, the waveform diagram being explanatory of how the analog audio signal is digitized, with each sample of the audio signal expressed by a binary 0 or 1.

At (A) in FIG. 3 is shown an example of analog input signal fed into this delta-sigma modulator over the line 31, and at (B) the bit clock pulses delivered from clock 35 to one-bit quantizer 34. The resulting binary digital output from the quantizer 34, seen at (C) in FIG. 3, is fed back to the differentiator 32 after being delayed by one sampling interval by the delay circuit 36. The differentiator 32 puts out a signal indicative of the results of subtraction of the delay circuit output signal from the FIG. 3(A) analog input signal. Inputting this differentiator output signal, the integrator 33 provides an output waveform as the time integral of the input waveform.

Clocked by the FIG. 3(B) pulses from the clock 35, the one-bit quantizer 34 quantizes the output from the integrator 33 as at (C) in FIG. 3. In principle the quantizer 34 puts out a logical 1 during the positive half-cycles of the analog input signal, in which the signal magnitude is greater than the reference level $V_r$, FIG. 3(A), and a logical 0 during the negative half-cycles of the input signal. However, in the FIG. 2 modulator including the differentiator 32, integrator 33, and negative feedback loop including the delay circuit 36, the quantizer output takes the form of a pulse train, containing both 1s and 0s during both positive and negative half-cycles of the analog signal.

As is clear from a comparison of the analog input signal at (A) in FIG. 3 and its digital equivalent at (C) in the same figure, the digital signal increases in the density of 1s in proportion with a rise in the voltage of the analog signal, and in the density of 0s in proportion with a drop in the voltage of the analog signal. The delta-sigma modulation may therefore be thought of as a sort of "pulse density modulation," in which the analog signal has its voltage expressed in terms of pulses per unit length of time.

Whereas each sample of the audio signal is translated into a plurality of, sixteen for example, bits in the conventional pulse-code modulation, the delta-sigma modulation employs but either of the binary digits 0 and 1 for expressing each sample of the analog signal. Let it be assumed that an audio signal of given volume is now both delta-sigma and pulse-code modulated into digital signals that are the same in the total number of bits. Then the sampling frequency of delta-sigma modulation can be made very much (e.g. sixteen times) higher than that of pulse-code modulation. A higher-resolution analog-to-digital conversion is therefore possible by delta-sigma modulation without an increase in the total number of bits for a given signal volume. It is understood that the sampling frequency of the delta-sigma modulators 22 and 23 is set at 2.8224 megahertz, sixty-four times higher than that (44.1 kilohertz) of pulse-code modulation for regular audio CDs.

PCM Adapter

The PCM adapter 3 is designed to be connected to the reformatted one-bit signal inputs $8_a$–$8_h$ of the PCM recorder/player 1 when the one-bit signals from the one-bit-per-sample modulator circuit 2 are to be recorded on the magnetic tape 17, as taught by this invention. Despite the showing of FIG. 1 the PCM adapter 3 could be integrated with either or both of the one-bit-per-sample modulator circuit 2 and the one-bit-per-sample demodulator 4.

Figure 4:
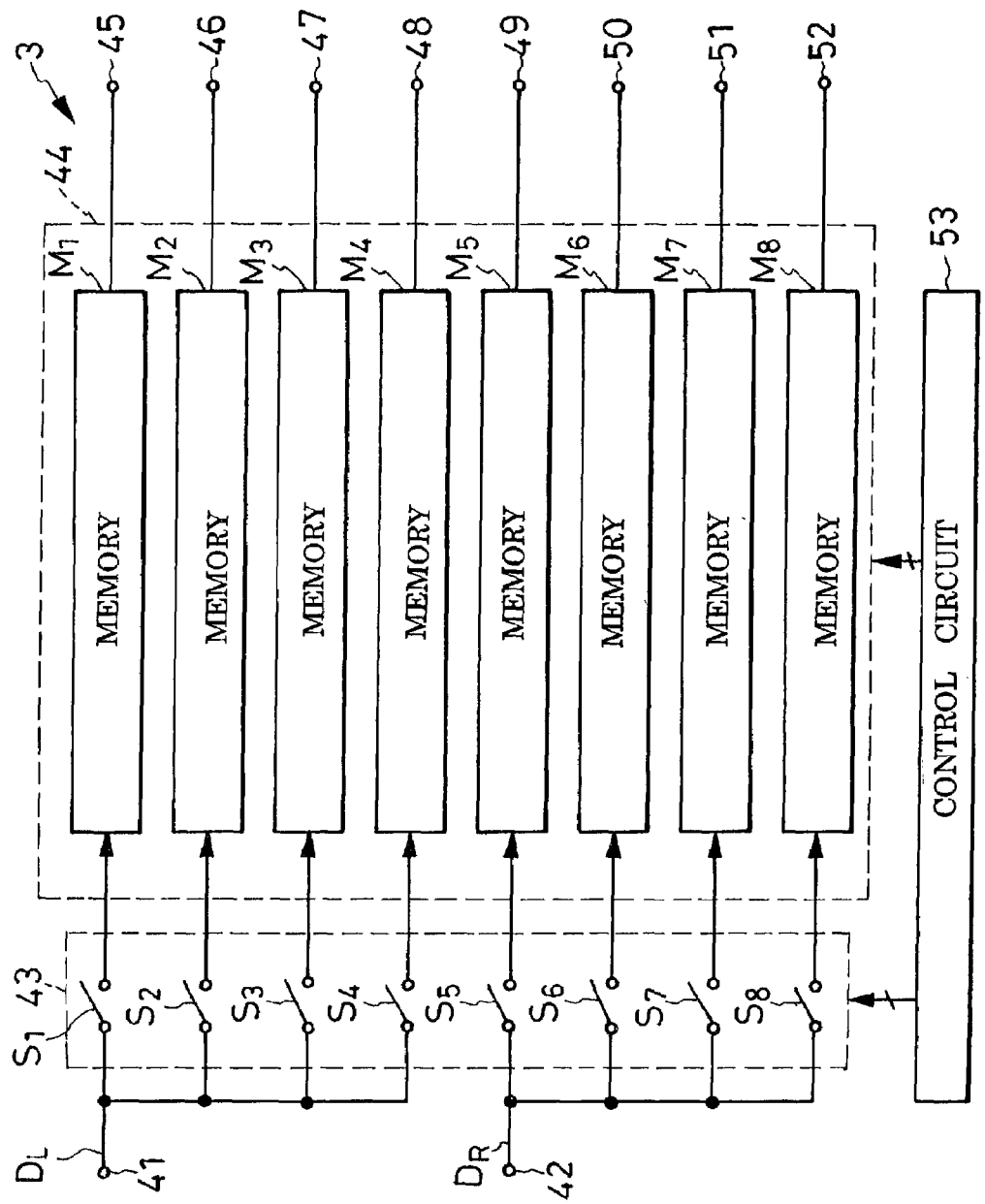
FIG. 4 is a schematic electrical diagram of the pulse code modulation adapter of the FIG. 1 recording system.

As illustrated in detail in FIG. 4, the PCM adapter 3 has two input terminals 41 and 42 for inputting left and right channels of one-bit signals $D_L$ and $D_R$ from their unshown sources. Both channels of bit streams are input at 2.8224 megahertz. The input terminals 41 and 42 are both connected to a bit stream divider 43 having eight on/off switches $S_1$–$S_8$. The first four switches $S_1$–$S_4$ are all connected to the left-channel input 41, and the remaining four switches $S_5$–$S_8$ to the right-channel input 42. A control circuit 53 is connected to the bit stream divider 43 for on/off control of its constituent switches $S_1$–$S_8$.

Figure 5:
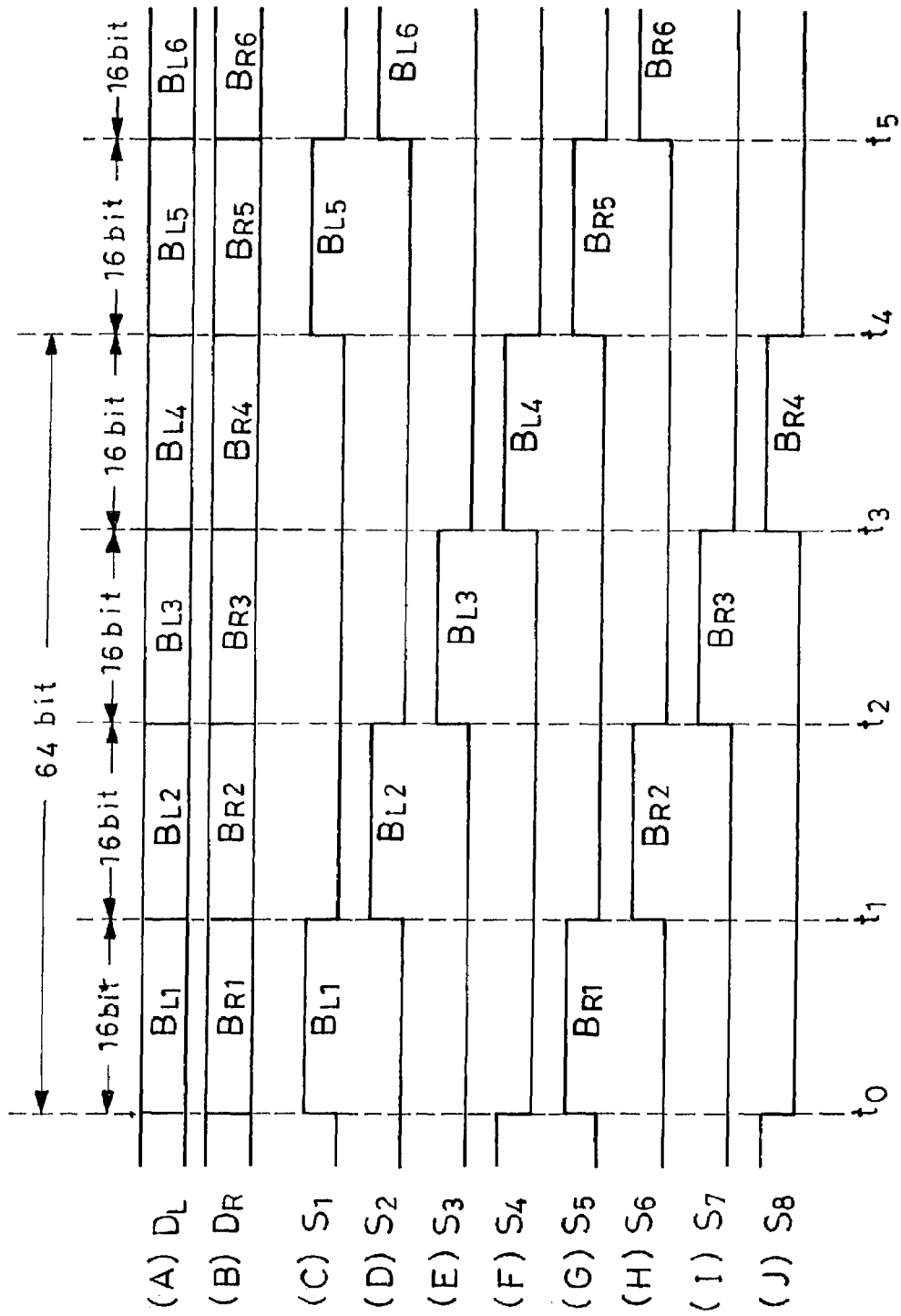
FIG. 5, consisting of (A) through (J), is a waveform diagram explanatory of how the bit streams of delta-sigma modulated signals are divided into segments by the bit stream divider shown in FIG. 4.
Figure 6:
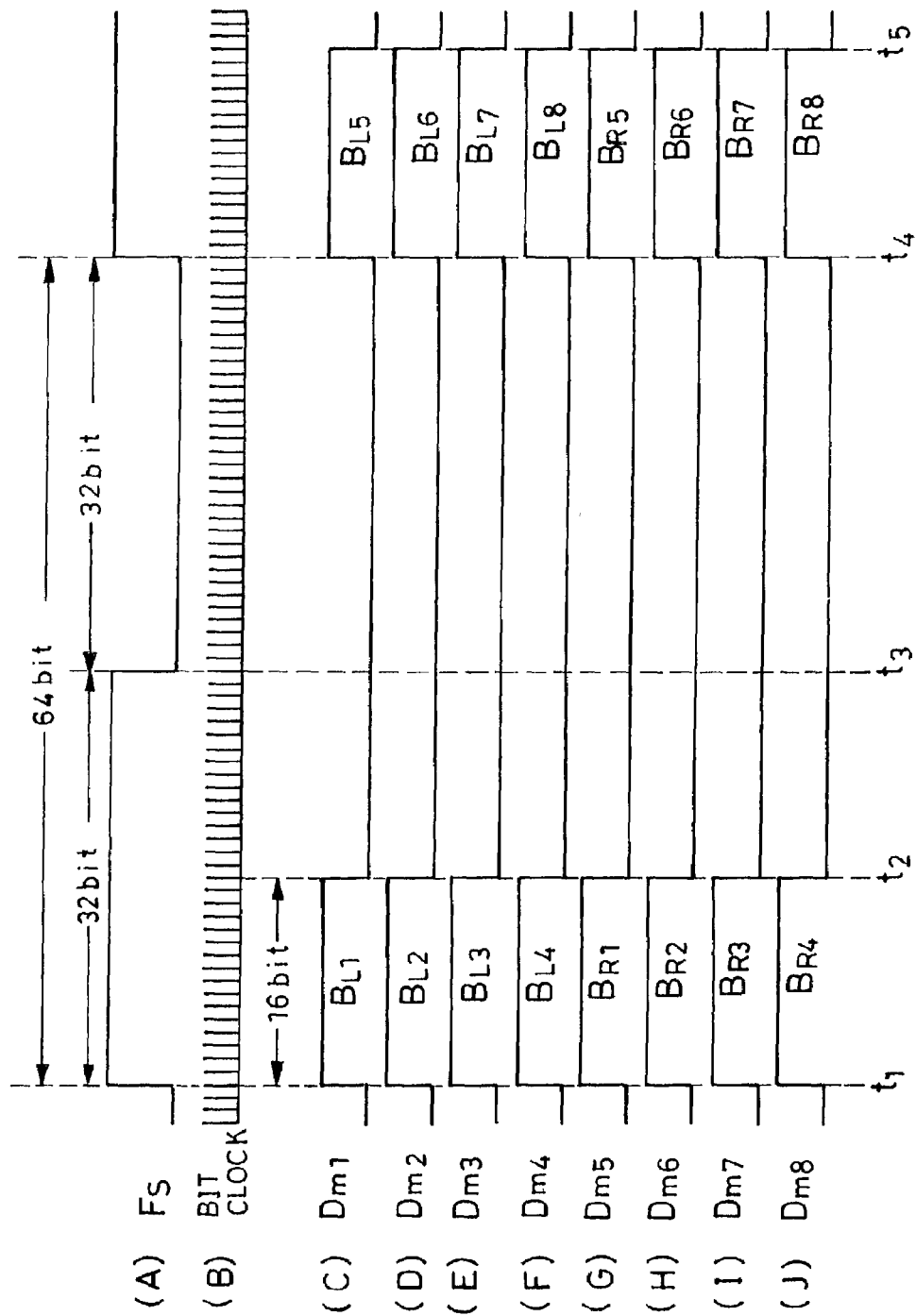
FIG. 6, consisting of (A) through (J), is a waveform diagram explanatory of how the bit segments of FIG. 5 are reformatted into signals that are recordable by the pulse code modulation recorder of FIG. 1.

At (A) and (B) in FIG. 5 are shown both channels of bit streams $D_L$ and $D_R$ supplied to the PCM adapter 3 from the one-bit-per-sample modulator circuit 2. As indicated at (C) through (F) in this figure, the left-channel group of switches $S_1$–$S_4$ are sequentially turned on, one at a time, during the successive sixteen-bit periods of the bit streams $D_L$ and $D_R$, as from $t_0$ to $t_1$, from $t_1$ to $t_2$, etc., thereby dividing the left-channel bit stream into successive sixteen-bit segments $B_{L1}$, $B_{L2}$, $B_{L3}$, . . . . The right-channel group of switches $S_5$–$S_8$ are likewise sequentially turned on during the successive sixteen-bit periods, with consequent division of the right-channel bit stream into successive sixteen-bit segments $B_{R1}$, $B_{R2}$, $B_{R3}$, . . . .

Connected next to the bit stream divider 43 is a reformatting circuit 44 comprising eight memories $M_1$–$M_8$. The first four memories $M_1$–$M_4$ are to the left-channel input 41 via the switches $S_1$–$S_8$, respectively, and the other four memories $M_5$–$M_8$ to the right-channel input 42 via the switches $S_5$–$S_8$, respectively. The memories $M_1$–$M_8$ take the form of shift registers, for example, capable of inputting the associated left- or right-channel bit segments and rearranging them from two into eight channels for recording on the PCM recorder/player 1. The eight reformatted one-bit signals $Dm_1$–$Dm_8$ are delivered to the eight adapter output terminals 45–52 and thence to the inputs $8_a$–$8_h$ of the PCM recorder/player 1 thereby to be recorded in lieu of the eight-channel PCM signals $PCM_1$–$PCM_8$.

The control circuit 53 controls the switches $S_1$–$S_8$ as at (C) through (J) in FIG. 5, and the memories $M_1$–$M_8$ as at (C) through (J) in FIG. 6. Referring first to FIG. 5, it will be observed that the switches $S_1$ and $S_5$ are closed from $t_0$ to $t_1$, deriving the sixteen-bit segments $B_{L1}$ and $B_{R1}$ from the two channels of one-bit signals $D_L$ and $D_R$, respectively. The thus-derived bit segments $B_{L1}$ and $B_{R1}$ are stored on the associated memories $M_1$ and $M_5$. The switches $S_2$ and $S_6$ are closed during the next time interval $t_1$–$t_2$, deriving the segments $B_{L2}$ and $B_{R2}$ from the one-bit signals $D_L$ and $D_R$. These bit segments $B_{L2}$ and $B_{R2}$ are stored on the memories $M_2$ and $M_6$. The switches $S_3$ and $S_7$ are closed during the ensuing time interval $t_2$–$t_3$, extracting the segments $B_{L3}$ and $B_{R3}$ from the one-bit signals $D_L$ and $D_R$. These bit segments $B_{L3}$ and $B_{R3}$ are stored on the memories $M_3$ and $M_7$. The switches $S_4$ and $S_8$ are closed during the subsequent time interval $t_3$–$t_4$, extracting the segments $B_{L4}$ and $B_{R4}$ from the one-bit signals $D_L$ and $D_R$. These bit segments $B_{L4}$ and $B_{R4}$ are stored on the memories $M_4$ and $M_8$. The same cycle of operation repeats itself after $t_4$.

After being temporarily stored on the memories $M_1$–$M_8$, the bit segments of the two one-bit signals $D_L$ and $D_R$ are put out therefrom in preadjusted time relationship to one another. FIG. 6 is an illustration of such preadjusted time relationship. As indicated at (C) through (J) in this figure, the four bit segments $B_{L1}$–$B_{L4}$ of the left-channel one-bit signal $D_L$, and the four bit segments $B_{R1}$–$B_{R4}$ of the right-channel one-bit signal $D_R$ are all put out simultaneously by the memories $M_1$–$M_8$ during the $t_1$–$t_2$ period in FIG. 6. The next group of four bit segments $B_{L5}$–$B_{L8}$ of the left-channel one-bit signal $D_L$, and the next group of four bit segments $B_{R5}$–$B_{R8}$ of the right-channel one-bit signal $D_R$ are also all put out simultaneously by the memories $M_1$–$M_8$ during the $t_4$–$t_5$ period in FIG. 6. This moment $t_4$ comes 48 bit clock pulses later from $t_2$. The memories $M_1$–$M_8$ repeat the same operation for both channels of one-bit signals $D_L$ and $D_R$ with every 64 bit clock pulses seen at (B) in FIG. 6.

The time-spaced bit segments shown at (C) through (J) in FIG. 6 constitute the reformatted one-bit signals $Dm_1$–$Dm_8$. Each set of eight bit segments, $B_{L1}$–$B_{L4}$ and $B_{R1}$–$B_{R4}$ for example, of the reformatted one-bit signals $Dm_1$–$Dm_8$ are all contained in time alignment within one sixty-four-bit cycle of the PCM sampling signal $F_s$ shown at (A) in FIG. 6. The reformatted one-bit signals $Dm_1$–$Dm_8$ are therefore essentially equivalent in format to the PCM signals to be produced by the PCM circuits $6_a$–$6_h$, FIG. 1, of the PCM recorder/player 1.

The eight reformatted one-bit signal output terminals 45–52 of the PCM adapter 3 are connected via a connector 54 to the associated input terminals $8_a$–$8_h$ of the PCM recorder/player 1. The PCM adapter 3 may be connected to the PCM recorder/player 1 only when the two channels of reformatted one-bit signals are to be recorded on the magnetic tape 17, and disconnected therefrom when the eight channels of PCM signals are to be recorded. The input terminals $8_a$–$8_h$ and the connector 54 may be thought of as switch means for selective connection of the PCM adapter 3 to the PCM recorder/player 1. Alternatively, additional switches, not shown, may be connected between input terminals $8_a$–$8_h$ and switches $7_a$–$7_h$, or between the outputs 45–52 of the PCM adapter 3 and the inputs $8_a$–$8_h$ of the PCM recorder/player 1.

Entering the PCM recorder/player 1 from the input terminals $8_a$–$8_h$, the reformatted one-bit signals $Dm_1$–$Dm_8$ are directed into the recording circuit 9. This circuit will then conventionally operate to create a time-compressed bit stream of the eight reformatted one-bit signals $Dm_1$–$Dm_8$, as at (B) in FIG. 7, just like that of the PCM signals $PCM_1$–$PCM_8$ shown at (A) in the same figure. The reformatted one-bit signals will be recorded on the tape 17 along with standard error-detecting code such as cyclic redundancy checks.

For playback, the reformatted one-bit signals $Dm_1$–$Dm_8$ recovered from the tape 17 are extended in time by the playback circuit 11 and returned to the state of (C) through (J) in FIG. 6. Then these signals are directed into the demodulator 4 thereby to be processed back to the two channels of one-bit signals $D_L$ and $D_R$ seen at (A) and (B) in FIG. 5. The one-bit signals $D_L$ and $D_R$ are to be conventionally filtered for provision of analog audio signals free from high-frequency noise.

Thus, according to this first preferred form of one-bit signal recording system, the two channels of delta-sigma-modulated audio signals are inexpensively recordable and reproducible by the PCM recorder/player 1 of largely conventional make. The PCM recorder/player itself needs no major alteration of construction, all that is required for recording of one-bit signals being to connect the PCM adapter 3, so that it lends itself to use for both recording and reproduction of both PCM and one-bit signals.

Figure 9:
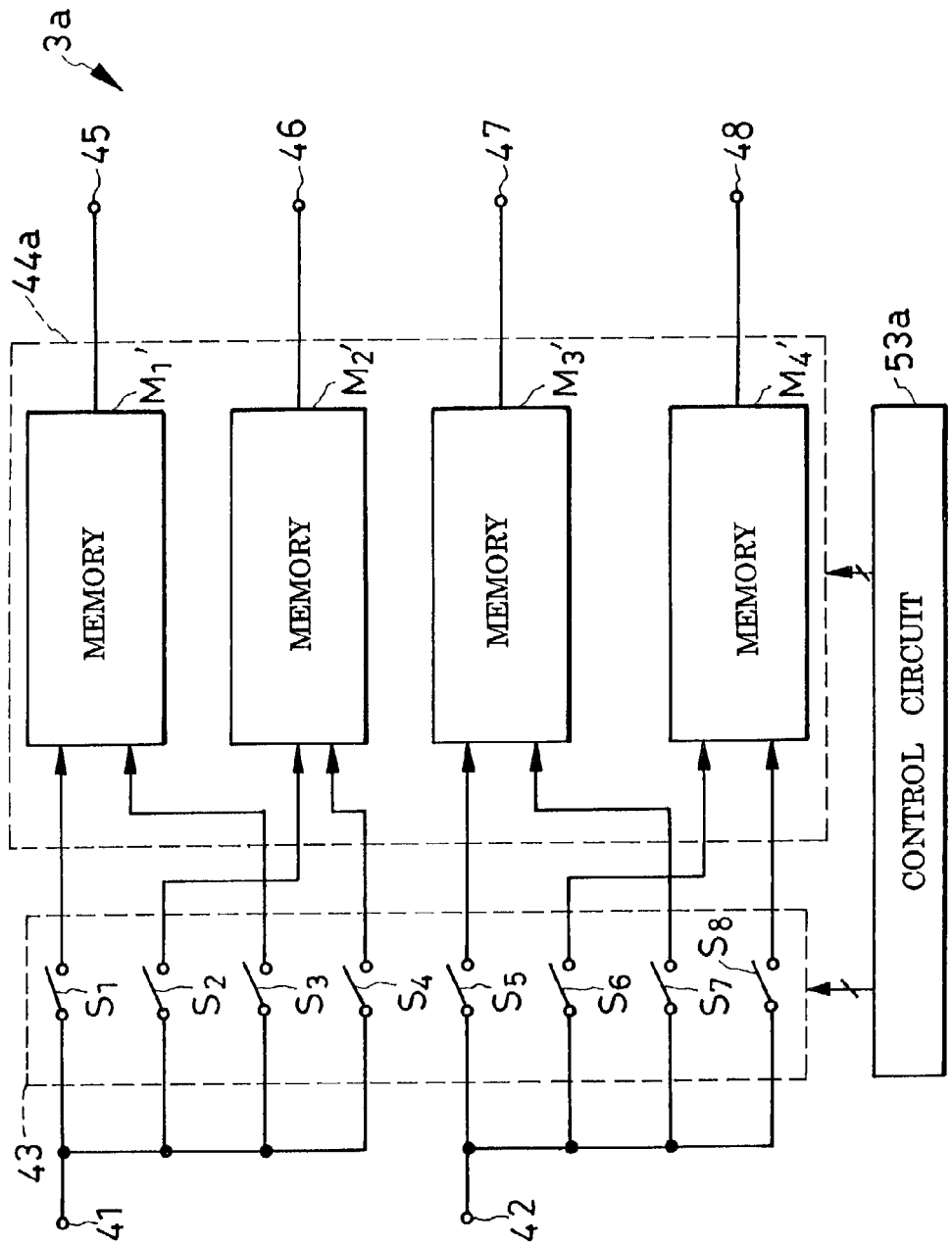
FIG. 9 is a schematic electrical diagram of the pulse code modulation adapter of the FIG. 8 recording system.

Embodiment of FIGS. 8–10

This second embodiment represents an adaptation of the present invention to a four-channel PCM recorder/player shown at $1_a$ in FIG. 8. The PCM recorder/player $1_a$ has four PCM circuits $6_a$–$6_d$ having inputs connected to analog input terminal $5_a$–$5_d$, and outputs connected to the recording circuit 9 via switches $7_a$–$7_d$. The PCM recorder/player $1_a$ is akin to its FIG. 1 counterpart 1 in all the other details of construction, the only difference therebetween being the number of channels handled.

In conformity with the four-channel PCM recorder/player $1_a$, there is provided a PCM adapter $3_a$ having but four output terminals 45–48, as indicated in both FIGS. 8 and 9, which are coupled to the input terminals $8_a$–$8_d$ of the PCM recorder/player 1a via the connector 54. FIG. 10 depicts at (C) through (F) the four reformatted one-digit signals $Dm_1'$–$Dm_4'$ which are delivered from the output terminals 45–48 of the PCM adapter $3_a$ to the PCM recorder/player $1_a$. For creation of the four reformatted one-digit signals $Dm_1'$–$Dm_4'$, the PCM adapter $3_a$ comprises the bit stream divider 43, a reformatting circuit $44_a$, and a control circuit $53_a$. Comprising eight switches $S_1$–$S_8$, the bit stream divider 43 operates just like its FIG. 3 counterpart, dividing both channels of bit stream into successive sixteen-bit segments $B_{L1}$, $B_{L2}$, $B_{L3}$, . . . and $B_{R1}$, $B_{R2}$, $B_{R3}$, . . . , as in FIG. 5.

The reformatting circuit $44_a$ has four memories $M_1'$–$M_4'$. The first memory $M_1'$ has inputs connected to the first and third switches $S_1$ and $S_3$. The second memory $M_2'$ has inputs connected to the second and fourth switches $S_2$ and $S_4$. The third memory $M_3'$ has inputs connected to the fifth and seventh switches $S_5$ and $S_7$. The fourth memory $M_4'$ has inputs connected to the sixth and eighth switches $S_6$ and $S_8$.

As the first and third switches $S_1$ and $S_3$ extract the bit segments $B_{L1}$ and $B_{L3}$ from the left-channel bit stream as at (C) and (E) in FIG. 5, the first memory $M_1'$ rearranges them as at (C) in FIG. 10 and puts out the first reformatted one-bit signal $Dm_1'$ which meets the sixty-four-bit data format of the PCM signals handled by the PCM recorder/player $1_a$. The second memory $M_2'$ rearranges as at (D) in FIG. 10 the bit segments $B_{L2}$ and $B_{L4}$ which have been derived from the left-channel bit stream by the second and fourth switches $S_2$ and $S_4$ as at (D) and (F) in FIG. 5. The second reformatted one-bit signal $Dm_2'$ thus issues from the second memory $M_2'$. Extracted from the right-channel bit stream by the fifth and seventh switches $S_5$ and $S_7$ as at (G) and (I) in FIG. 5, the bit segments $B_{R1}$ and $B_{R3}$ are rearranged by the third memory $M_3'$ into the third reformatted one-bit signal $Dm_3'$ as at (E) in FIG. 10. Also extracted from the right-channel bit stream by the sixth and eighth switches $S_6$ and $S_8$ as at (H) and (J) in FIG. 5, the bit segments $B_{R2}$ and $B_{R4}$ are rearranged by the fourth memory $M_4'$ into the fourth reformatted one-bit signal $Dm_4'$ as at (F) in FIG. 10.

Figure 11:
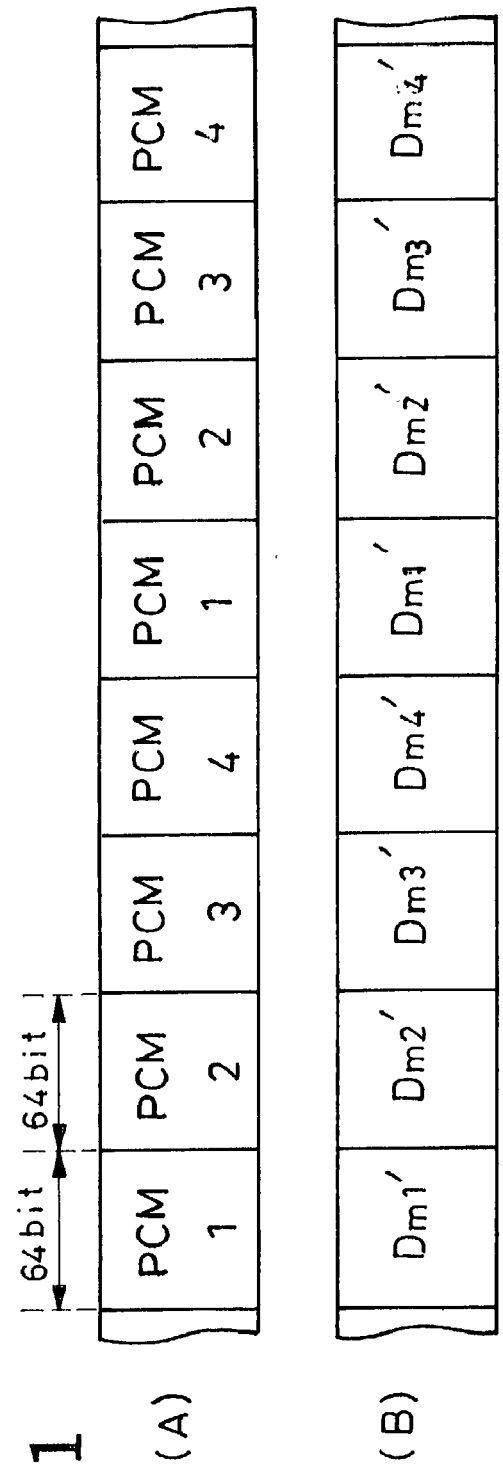
FIG. 11, consisting of (A) and (B), is a diagram explanatory of how the pulse-code-modulated and reformatted-one-bit-per-sample signals are recorded by the pulse code modulation recorder of FIG. 8.

FIG. 11 is explanatory of the operation of the recording circuit $9_a$ of the FIG. 8 PCM recorder/player $1_a$. Upon inputting the four PCM signals $PCM_1$–$PCM_4$ in parallel from the PCM circuits $6_a$–$6_d$, the recording circuit $9_a$ compresses them in time and rearranges the time-compressed signals serially as at (A) in FIG. 11. The reformatted one-bit signals $Dm_1'$–$Dm_4'$ from the PCM adapter $3_a$ are likewise compressed in time and rearranged serially as at (B) in FIG. 11. The resulting serial output from the recording circuit $9_a$, either the PCM bit stream of FIG. 11(A) or the reformatted one-bit signal bit stream of FIG. 11(B), is directed into the record/playback means 10.

The FIG. 8 PCM recorder/player $1_a$ is akin to its FIG. 1 counterpart 1 in all the other details of construction and operation. Thus the playback circuit $11_a$, pulse-code demodulator $12_a$, and one-bit-per-sample demodulator function to process the signals shown at (A) and (B) in FIG. 11, on their recovery from the magnetic tape 17, back into the original analog signals. It will also be apparent that the FIG. 8 recording system gains the same advantages as does that of FIG. 1, the only fundamental difference therebetween being that the FIG. 8 device $1_a$ has only half as many PCM signal channels as does the FIG. 1 device 1.

Possible Modifications

Notwithstanding the foregoing detailed disclosure it is not desired that the present invention be limited by the exact showing of the drawings or by the description thereof. The following is a brief list of possible modifications or alterations of the illustrated embodiments:

1. The PCM recorder/player 1 or $1_a$ could itself be modified to incorporate the one-bit-per-sample modulator circuit 2, PCM adapter 3 or $3_a$, and one-bit-per-sample demodulator 4 or $4_a$.

2. The bit segment $B_{L2}$ could be substituted for the bit segment $B_{L3}$ in the first reformatted one-bit signal $Dm_1'$ shown at (c) in FIG. 10, and the bit segment $B_{L3}$ for the bit segment $B_{L2}$ in the second reformatted one-bit signal $Dm_2'$ at (D) in FIG. 10. Similarly, in the third and fourth reformatted one-bit signals $Dm_3'$ and $Dm_4'$ shown at (E) and (F) in FIG. 10, the bit segments $B_{R2}$ and $B_{R3}$ could be interchanged.

3. Any recording media other than magnetic tape, such as magnetic disks, optical disks or magneto-optic disks could be employed.

4. The invention could be applied to PCM recorders in which the PCM signals of different channels are independently recorded on separate tracks of a recording medium.

What is claimed is:

1. A method of recording a one-bit-per-sample digital signal which comprises:
   (a) providing a pulse code modulation recorder capable of recording on a record medium a plurality of channels of pulse-code-modulated signals each having a cycle constituted of a predetermined number of bits;
   (b) inputting a one-bit-per-sample signal in the form of a stream of bits, such that each sample of an analog signal is expressed by either of two binary digits;
   (c) dividing the bit stream of the one-bit-per-sample signal into a series of segments each constituted of a submultiple of the predetermined number of bits of each cycle of the pulse-code-modulated signals, wherein each segment comprises the same number of bits as the number of bits constituting each sample of the pulse-code-modulated signals; and
   (d) introducing each predetermined number of bit segments of the one-bit-per-sample signal into the pulse-code modulation recorder during each cycle of the pulse-code-modulated signals thereby to be recorded on the record medium.

2. The recording method of claim 1 wherein each predetermined number of bit segments of the one-bit-per-sample signal are simultaneously supplied to the pulse code modulation recorder during each cycle of the pulse-code-modulated signals.

3. The recording method of claim 1 wherein each predetermined number of bit segments of the one-bit-per-sample are simultaneously supplied to the pulse code modulation recorder during each half-cycle of the pulse-code-modulated signals.

4. An apparatus for recording a on-bit-per-sample digital signal, comprising:
   (a) a pulse code modulation recorder capable of recording a plurality of channels of pulse-code-modulated signals of a predefined format on a record medium;
   (b) inputting means for inputting a one-bit-per-sample signal in the form of a stream of bits each representing one sample of an analog signal;
   (c) bit stream divider means connected to the one bit per sample modulator inputting means for dividing the bit stream of the one-bit-per-sample signal into a series of segments each constituted of a predetermined number of bite submultiple of the predetermined number of bits of each cycle of the pulse-code-modulated signals, wherein each segment comprises the same number of bits as the number of bits constituting each sample of the pulse-code-modulated signals; and
   (d) reformatting means connected to the bit stream divider means for rearranging the bit segments of the one-bit-per-sample signal into a plurality of reformatted one-bit-per-sample signals having a format in agreement with the predefined format of the pulse-code-modulated signals, the reformatting means having outputs connected to the pulse code modulation recorder for delivering thereto the reformatted one-bit-per-sample signals to be recorded on the record medium.

5. The recording apparatus of claim 4 wherein the bit stream divider means comprises a plurality of switches to be opened and closed for dividing the bit stream of the one-bit-per-sample signal into the segments.

6. The recording apparatus of claim 5 wherein the reformatting means comprises a plurality of memories connected one to each switch of the bit stream divider means for inputting the bit segments of the one-bit-per-sample signal and putting the same out in prescribed time relationship to each other.

7. An apparatus for recording a one-bit-per-sample digital signal, comprising:
   (a) a multichannel pulse code modulation recorder comprising a plurality of pulse code modulator circuits for pulse-code-modulating multichannel analog signals according to a predefined format, and a recording circuit having inputs connected respectively to the pulse code modulator circuits for processing the pulse-code-modulated signals preparatory to recording on a record medium, the recorder having a set of one-bit-per-sample signal inputs connected respectively to the inputs of the recording circuit;

(b) a one-bit-per-sample modulator circuit for modulating an analog signal into a one-bit-per-sample signal in the form of a stream of bits each representing one sample of the analog signal; and (c) a pulse code modulation adapter connected to the one-bit-per-sample modulator circuit for reformatting the one-bit-per-sample signal into a plurality of reformatted one-bit-per-sample signals having a format in agreement with the predefined format of the pulse-code-modulated signals, the pulse code modulated adapter being capable of connection to, and disconnection from, the one-bit-per-sample signal inputs of the multichannel pulse code modulation recorder and, when connected thereto, delivering the reformatted one-bit-per-sample signals to be recorded on the record medium, wherein the pulse code modulation adapter comprises:

(1) bit stream divider means connected to the one-bit-per-sample modulator circuit for dividing the bit stream of the one-bit-per-sample signal into a series of segments each constituted of a submultiple of the predetermined number of bits of each cycle of the pulse-code-modulated signals, wherein each segment comprises the same number of bits as the number of bits constituting each sample of the pulse-code-modulated signals; and (2) a reformatting circuit connected to the bit stream divider means for rearranging the bit segments of the one-bit-per-sample signal into the reformatted one-bit-per-sample signals.

8. A pulse code modulation adapter for use in recording a one-bit-per-sample digital signal by a pulse code modulation recorder capable of recording a plurality of channels of pulse-code-modulated signals of a predefined format on a record medium, the pulse code modulation adapter comprising:

(a) input means for inputting a one-bit-per-sample signal in the form of a stream of bits each representing one sample of an analog signal;

(b) bit stream divider means connected to the input means for dividing the bit stream of the one-bit-per-sample signal into a series of segments each constituted of a submultiple of the predetermined number of bits of each cycle of the pulse-code-modulated signals, wherein each segment comprises the same number of bits as the number of bits constituting each sample of the pulse-code-modulated signals; and (c) reformatting means connected to the bit stream divider means for rearranging the bit segments of the one-bit-per-sample signal into a plurality of reformatted one-bit-per-sample signals having a format in agreement with the predefined format of pulse-code-modulated signals recordable by the pulse code modulation recorder, the reformatting means having outputs to be connected to the pulse code modulation recorder for delivering thereto the reformatted one-bit-per-sample signals to be recorded on the record medium.

9. A pulse code modulation adapter of claim 8 further comprising a one-bit-per-sample modulator circuit for modulating an analog signal into a one-bit-per-sample signal in the form of a stream of bits each representing one sample of the analog signal.

* * * * *